US009643518B2

(12) United States Patent
Correia et al.

(10) Patent No.: US 9,643,518 B2
(45) Date of Patent: May 9, 2017

(54) MOTOR VEHICLE SEAT COMPRISING A SEATBACK PART WITH A DETACHABLE PART PROVIDED WITH STORAGE MEANS

(71) Applicant: RENAULT s.a.s., Boulogne Billancourt (FR)

(72) Inventors: Miguel Correia, Pierres (FR); Guillaume Brotonne, Septeuil (FR); David Lancelot, Gemigny (FR)

(73) Assignee: RENAULT s.a.s., Boulogne Billancourt (FR)

( * ) Notice: Subject to any disclaimer, the term of this patent is extended or adjusted under 35 U.S.C. 154(b) by 0 days.

(21) Appl. No.: 14/772,018

(22) PCT Filed: Feb. 17, 2014

(86) PCT No.: PCT/FR2014/050317

§ 371 (c)(1),
(2) Date: Sep. 1, 2015

(87) PCT Pub. No.: WO2014/131964

PCT Pub. Date: Sep. 4, 2014

(65) Prior Publication Data

US 2016/0016491 A1 Jan. 21, 2016

(30) Foreign Application Priority Data

Mar. 1, 2013 (FR) ..................................... 13 51867

(51) Int. Cl.
*B60N 2/015* (2006.01)
*B60N 2/68* (2006.01)
(Continued)

(52) U.S. Cl.
CPC ......... *B60N 2/01508* (2013.01); *B60N 2/015* (2013.01); *B60N 2/3045* (2013.01);
(Continued)

(58) Field of Classification Search
CPC B60N 2/015; B60N 2/01508; B60N 2/01516; B60N 2/3097; B60N 2/32;
(Continued)

(56) References Cited

U.S. PATENT DOCUMENTS 6,991,285 B1 * 1/2006 Hemenway ........... B60N 2/203 296/65.01
7,029,421 B2 4/2006 Henneken et al.
(Continued)

FOREIGN PATENT DOCUMENTS

CN 101318482 A 12/2008
CN 202341431 U 7/2012
(Continued)

OTHER PUBLICATIONS

English translation of DE 20311668; retreived on Sep. 8, 2016 via PatentTranslate located at www.epo.org.*
(Continued)

*Primary Examiner* — Jason S Daniels
(74) *Attorney, Agent, or Firm* — Oblon, McClelland, Maier & Neustad, L.L.P.

(57) ABSTRACT

A seat for a motor vehicle includes a back part and a sitting part. The back part includes at least one detachable main part, which is adapted to be entirely separated from the rest of the seat. The detachable main part also includes, at the rear, storage fixed to the detachable main part.

15 Claims, 5 Drawing Sheets

(51) Int. Cl.

| | |
|---|---|
| ***B60R 7/00*** | (2006.01) |
| ***B60R 7/04*** | (2006.01) |
| ***B60N 2/30*** | (2006.01) |
| ***B60N 2/32*** | (2006.01) |
| ***B60N 2/64*** | (2006.01) |
| ***B60R 11/00*** | (2006.01) |

(52) U.S. Cl.
CPC ................ *B60N 2/32* (2013.01); *B60N 2/64* (2013.01); *B60N 2/682* (2013.01); *B60N 2/688* (2013.01); *B60R 7/005* (2013.01); *B60R 7/043* (2013.01); *B60R 11/00* (2013.01); *B60N 2002/684* (2013.01); *B60N 2205/30* (2013.01); *B60R 2011/0015* (2013.01)

(58) Field of Classification Search
CPC . B60N 2/64; B60N 2/643; B60N 2/68; B60N 2/7005; B60R 7/005; B60R 7/043
USPC ............................... 296/37.15, 37.16, 65.01
See application file for complete search history.

(56) References Cited

U.S. PATENT DOCUMENTS

2005/0248189 A1* 11/2005 Prasatek .................. B60N 2/68
297/188.04
2008/0252111 A1* 10/2008 Rothkop ................ B60N 3/004
297/188.04

FOREIGN PATENT DOCUMENTS

| | | | | |
|---|---|---|---|---|
| DE | 20311668 U1 * | 12/2004 | ............... | B60N 2/48 |
| DE | 10 2008 045 859 | 3/2009 | | |
| FR | 2 950 005 | 3/2011 | | |
| WO | 02 097308 | 12/2002 | | |

OTHER PUBLICATIONS

International Search Report Issued May 9, 2014 in PCT/FR2014/050317 Filed Feb. 17, 2014.
French Preliminary Search Report Issued Nov. 21, 2013 in French Patent Application No. 1351867 Filed Mar. 1, 2013.

* cited by examiner

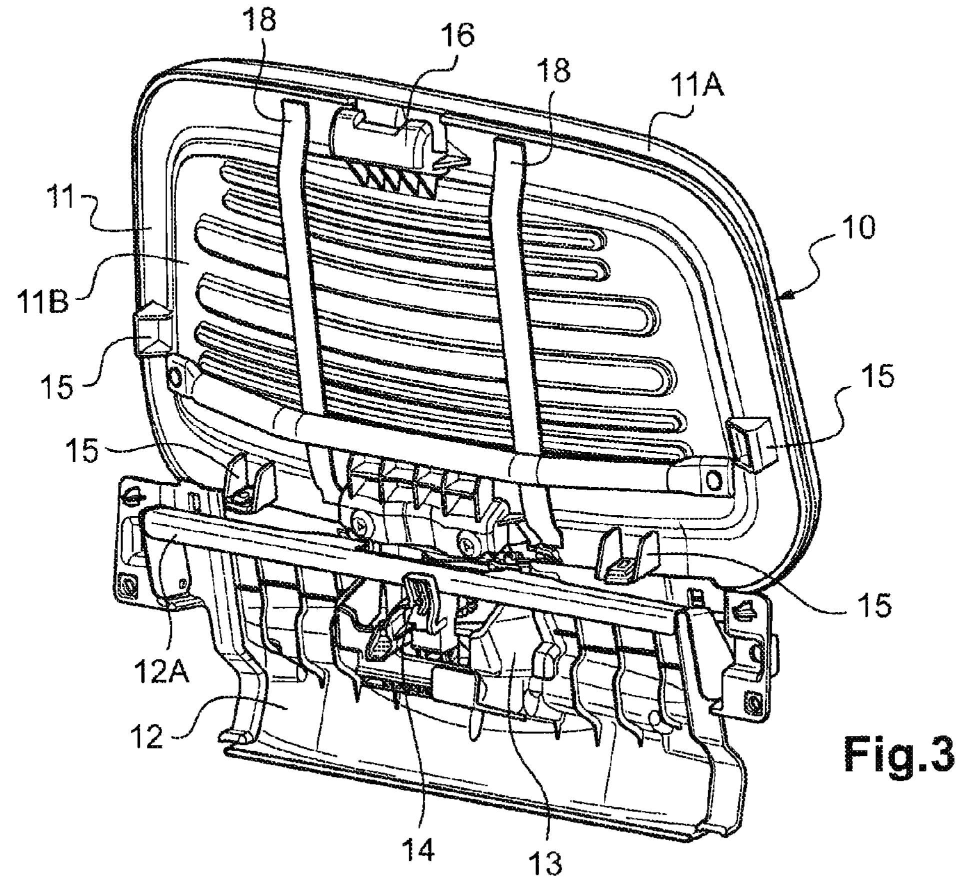
Fig.3
Fig.4
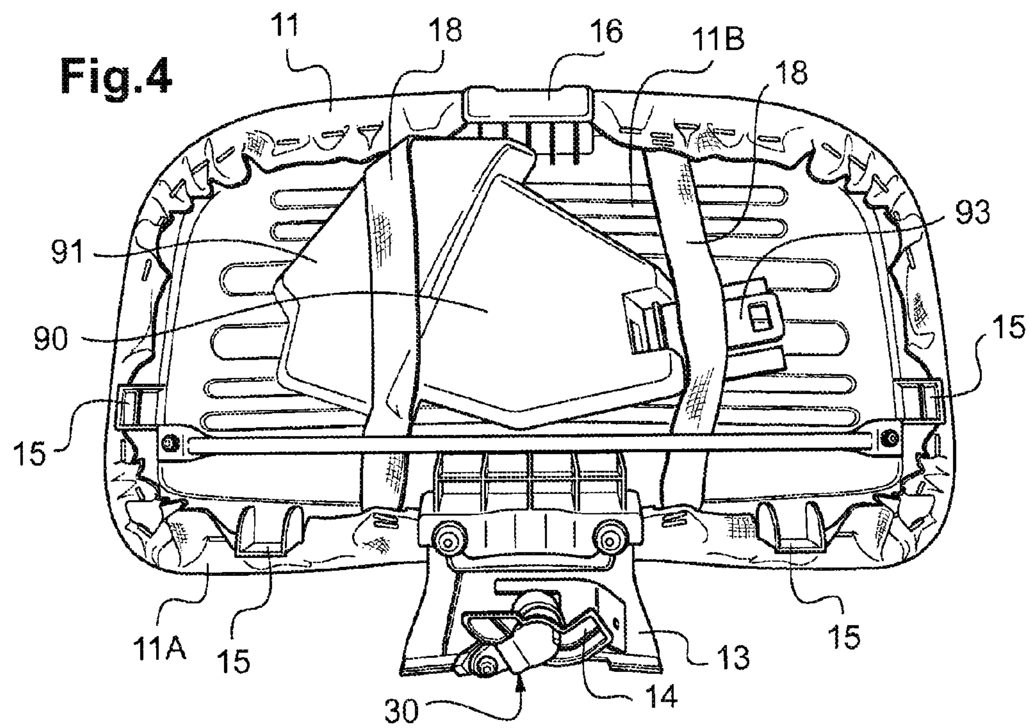

MOTOR VEHICLE SEAT COMPRISING A SEATBACK PART WITH A DETACHABLE PART PROVIDED WITH STORAGE MEANS

TECHNICAL FIELD TO WHICH THE INVENTION RELATES

The present invention relates in a general way to the field of seats for motor vehicles.

More particularly, it relates to a seat for a motor vehicle, comprising a back part and a sitting part.

It also relates to a motor vehicle comprising a seat of this type.

PRIOR ART

A seat such as that described in the introduction is known, notably from the document FR2950005.

More precisely, this seat comprises a sitting part which can be turned over. This sitting part can be placed either in a first receiving position, in which it is adapted to receive a passenger, or in a second, turned-over position in which it closes a housing delimited between the vehicle floor and this turned-over sitting part.

Thus this seat makes it possible to benefit from a storage space in the housing delimited by the sitting part in its turned-over position, while no passenger is sitting on the seat.

However, when the seat is occupied by a passenger, or when the seat is used in a motor vehicle having a very small interior space, this storage space may prove to be inadequate.

OBJECT OF THE INVENTION

In order to overcome the aforesaid drawback of the prior art, the present invention proposes a motor vehicle seat that can provide increased storage space, even when a passenger occupies this seat.

More particularly, the invention proposes a seat as defined in the introduction, in which said back part comprises at least one detachable main part, which is adapted to be entirely separated from the rest of the seat and which comprises, at the rear, storage means fixed to this detachable main part.

Thus the detachable part of the sitting part can receive storage means which are accessible to the user when this part is separated and removed from the seat. It can also be removed from the seat so as to free access to a recess located behind this back part, in the internal structure of the vehicle, in which certain objects can be stored.

Other non-limiting and advantageous characteristics of the seat according to the invention are as follows:

- said storage means comprise at least two elastic tapes;
- said elastic tapes are positioned vertically at the rear of the detachable part of the back part;
- said storage means comprise at least one net;
- said sitting part is capable of being turned over, between a receiving position in which it is adapted to receive a passenger and a turned-over position in which it forms a housing in its interior, and comprises an opening adapted to allow the passage of a safety belt buckle in its receiving position, a filler piece being provided for closing said opening in the turned-over position of the sitting part and said storage means being adapted to house said filler piece when the sitting part is in its receiving position;

- said detachable main part of the back part comprises means of retention on an internal structure of the passenger compartment of the vehicle;
- said back part further comprises a fixed part adapted to be mounted in a non-detachable way on an internal structure of the passenger compartment of the vehicle, said detachable part of the back part comprising means of interaction with complementary interaction means of this fixed part of the back part for holding it in a mounted position on this fixed part of the back part;
- said detachable main part of the back part comprises means for locking this detachable main part onto the sitting part, which simultaneously prevent the movement of this detachable main part of the back part and that of the sitting part.

The invention also relates to a motor vehicle comprising an internal structure delimiting the passenger compartment of the vehicle, and a seat such as that described above, mounted on said internal structure of the passenger compartment.

In this case, said internal structure advantageously comprises a recess located at the rear of the back part, the access to this recess being freed when said back part is separated from the rest of the seat.

BRIEF DESCRIPTION OF THE DRAWINGS

The following description, referring to the attached drawings which are provided by way of non-limiting example, will make the nature and application of the invention clear.

In the attached drawings:

FIG. 3 is a schematic rear view of the back part of the seat of FIG. 1, in which the storage means are empty, FIG. 4 is a schematic rear view of the detachable part of the back part of FIG. 3, in which the storage means house a filler piece.

DETAILED DESCRIPTION

Figure 1:
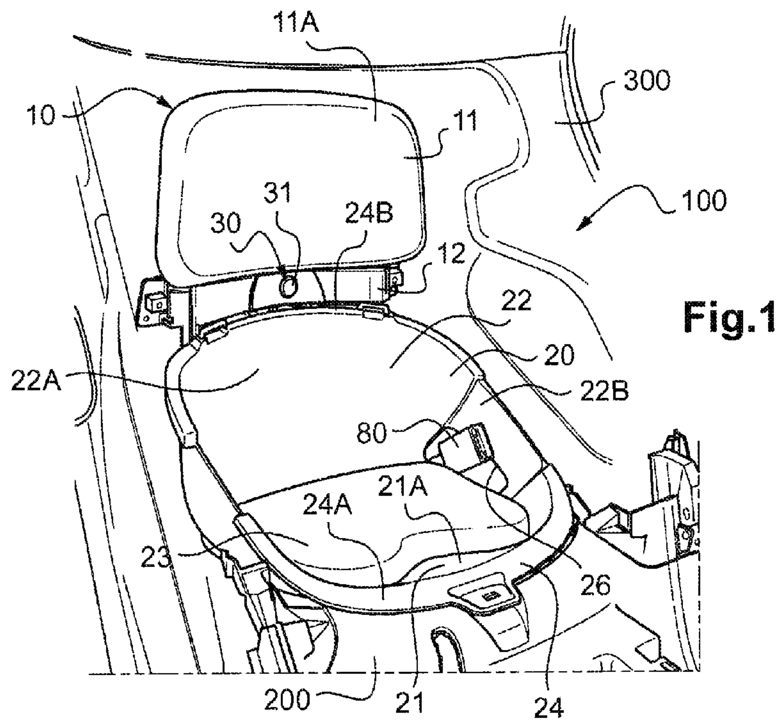
FIG. 1 is a schematic perspective view of the seat according to the invention with the sitting part in the receiving position.

By way of preamble, it should be noted that the terms “front” and “rear” on the one hand, and the terms “upper” and “lower” on the other hand, will be used in the description with reference to the conventional orientation of a seat in a motor vehicle, in which the passenger seated on the seat faces the road in forward travel.

FIGS. 1, 2, and 5 to 9 show a seat 100 for a motor vehicle according to the invention.

This seat 100 comprises a back part 10 and a sitting part 20.

The motor vehicle comprises, notably, a floor 200 and an internal structure 300 delimiting the passenger compartment of the vehicle. The seat 100 is mounted on this floor 200 and on this internal structure 300.

In a remarkable manner, said back part 10 comprises at least one detachable main part 11, which is adapted to be entirely separated from the rest of the seat 100, and which comprises, at the rear, storage means 18 fixed to this detachable main part 11.

This back part 10 is designed to extend substantially vertically in the motor vehicle according to the invention.

In this case, the back part 10 comprises the upper detachable main part 11 and a lower fixed part 12. The fixed part 12 of the back part 10 is fixed in a non-detachable way to the internal structure 300 of the passenger compartment of the vehicle, for example by screwing or by riveting.

The term "detachable" denotes the quality of a part that can be separated and removed from its environment manually, without the use of tools.

The detachable main part 11 of the back part 10 is a part designed to receive the back of a passenger. The back part 10 is different from a headrest designed to receive a passenger's head.

The detachable part 11 of the back part 10 has, in this case, a generally rectangular shape with rounded corners, with two opposed longitudinal edges linked by two lateral edges.

The detachable main part 11 of the back part 10 comprises a tab 13 (FIGS. 3 and 4) which extends substantially in the same plane as the front face of the detachable main part 11, from a first of its longitudinal edges. This first longitudinal edge is designed to interact with the fixed part 12 of the back part 10 when the detachable main part 11 is mounted on the seat 100.

This detachable main part 11 comprises a metal frame 11B covered in front by a textile cover 11A (FIGS. 3 and 4).

It also comprises, on the one hand, means 14 of interaction with complementary interaction means 12A of the fixed part 12 of the back part 10 (FIGS. 1 to 3) for retaining the detachable main part 11 on the fixed part 12, and, on the other hand, means 16 of retention on the internal structure 300 of the passenger compartment of the vehicle.

More precisely, in this case the fixed part 12 of the back part 10 comprises a rear transverse bar 12A which extends substantially horizontally at the rear of this fixed part 12 of the back part 10.

The means 14 for the interaction of the detachable main part 11 with the fixed part 12 comprise, for example, a mounting lug 14 which extends at the rear of the tab 13, substantially parallel to the rear face of the detachable main part 11 of the back part 10, and which can be moved between a fixing position in which it interacts with said transverse bar 12A to retain the detachable main part 11 on the fixed part 12 and a release position in which the detachable main part can be removed from the fixed part 12.

In practice, in the fixing position of the mounting lug 14, the transverse bar 12A of the fixed part 12 passes between the mounting lug 14 and the rear face of the detachable main part 11. In this case, this transverse bar 12A forms the complementary interaction means of the fixed part 12 of the back part.

The internal structure 300 of the motor vehicle comprises, in this case, an opening 301 (FIGS. 5 to 7) adapted to be closed by the detachable main part 11 of the back part 10.

Thus the peripheral edge of the opening 301 in the internal structure 300 of the vehicle is adapted to interact with the lateral edges and the second longitudinal edge of the detachable main part 11 of the back part 10 to hold the latter in place.

Additionally, a hook 16 is provided on the rear of this detachable main part of the back part, and is adapted to interact with a tooth 302 of the internal structure 300 which projects into the opening 301 receiving the main part of the back part 10, in order to retain the latter on the internal structure 300 when it is in place in the seat 100.

Finally, projections 15 are provided on the rear of the detachable main part 11 to guide its fitting into the opening 301 of the internal structure 300.

Advantageously, as explained in greater detail below, the opening 301 in said internal structure 300 opens into a first recess 303 in the internal structure 300 of the motor vehicle (FIG. 7), located at the rear of the back part 10, access to this recess being freed when the detachable main part 11 of said back part 10 is separated from the rest of the seat 100 and from the internal structure 300 of the vehicle.

The storage means 18 fixed to this detachable main part 11 comprise, in this case, at least two elastic tapes 18.

They are positioned vertically at the rear of the detachable main part 11 of the back part 10.

In a variant, said storage means comprise at least one net fixed at the rear of this detachable main part of the back part.

In the examples shown here, the sitting part 20 takes the form of a molded half-shell. It is made, for example, of plastic material.

In this case, this sitting part 20 comprises a sitting panel 21, bordered at least partially by a side panel 22.

Advantageously, the sitting part 20 is also detachable in this case. It is thus adapted to be entirely separated from the rest of the seat 100 and from the floor 200 of the vehicle, so as to free the access to other recesses in the internal structure and/or in the floor of the vehicle.

Figure 2:
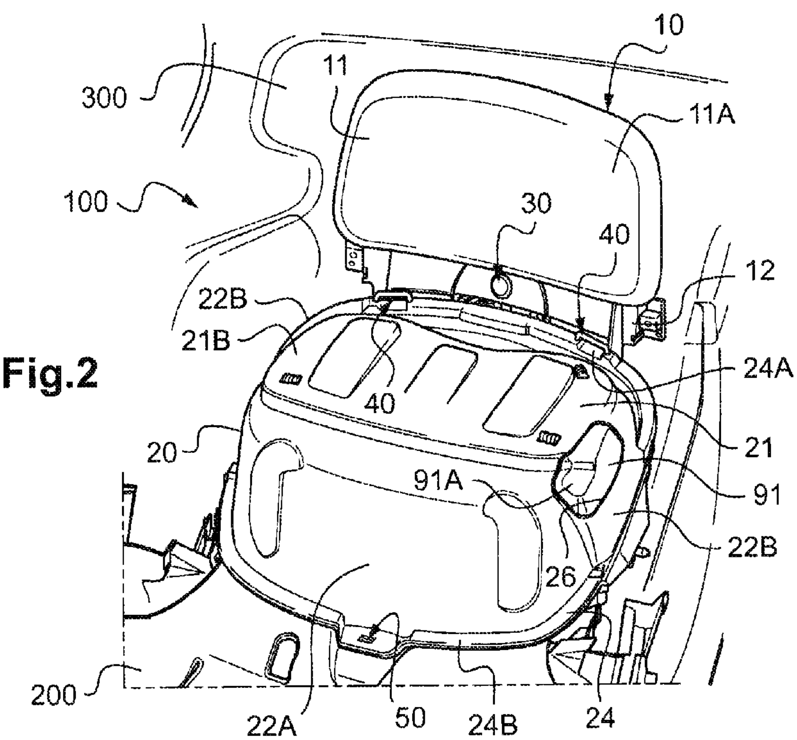
FIG. 2 is a schematic perspective view of the seat of FIG. 1 with the sitting part in the turned-over position.

More precisely, this sitting part 20 is capable of being turned over, since it is adapted to be mounted on the floor 200 of the vehicle in two distinct positions, namely a first receiving position, shown in FIG. 1, in which the side panel 22 extends in a first direction at the rear of the sitting panel 21 and forms a part of the back of the seat 100, and a second, turned-over position, shown in FIG. 2, in which the side panel 22 extends at the front of the sitting panel 21, in a second direction opposed to the first direction.

Thus, in the turned-over position, the sitting part 20 has been turned through 180 degrees around an axis generally parallel to the sitting panel 21 and to the back part 10.

In both of these positions, the sitting panel 21 of the sitting part 20 is designed to extend substantially horizontally in the motor vehicle.

The sitting panel 21 has an upper face 21A oriented toward the passenger in the receiving position of the sitting part 20, and an opposed lower face 21B (FIGS. 1 and 2) oriented toward the floor 200 of the vehicle in this receiving position. A seat cushion 23 is provided on the upper face 21A of the sitting panel 21 (FIG. 1).

The sitting panel 21 has a generally rectangular shape, with highly rounded corners in the present case. In the present case, the side panel 22 borders this sitting panel 21 along the first three of its sides. Thus it has a central portion 22A running along a longitudinal side of the sitting panel 21 and two end portions 22B running along the lateral sides of the sitting panel 21.

The second longitudinal side of the sitting panel 21, not bordered by the side panel 22, is referred to below as the front side of the sitting panel 21.

The free edge of the side panel 22 and of the front side of the sitting panel 21 is surrounded by an edging 24 which extends toward the outside of the sitting part 20.

The part of this edging 24 which runs along the front side of the sitting panel 21 is referred to below as the front edging 24A of the sitting part 20. The part of this edging 24 which runs along the central portion 22A of the side panel 22 is referred to below as the rear edging 24B of the sitting part 20.

The side panel 22 rises from the upper face 21A of the sitting panel 21 and has a variable height relative to this sitting panel 21.

More precisely, the height of the side panel 22 is at its maximum in the central portion 22A bordering the part of the sitting panel 21 opposed to said fourth side of the sitting panel 21. It then decreases along the end portions 22B until it meets the sitting panel 21 at the front side of the sitting panel 21.

In the receiving position of the sitting part (FIG. 1), the sitting panel 21 extends generally in continuation of the floor 200 of the vehicle. Thus it blocks a first opening formed under the seat 100 in the floor 200.

This first opening opens into a recess in the floor 200 of the vehicle.

The front edging 24A of the sitting part 20 is then oriented toward the front of the vehicle.

The central portion 22A of the side panel 22 then extends in continuation of the back part 10, between this back part 10 and the sitting panel 21 of the sitting part 20. This central portion 22A of the side panel 22 then forms, together with the back part 10, the back of the seat 100.

Evidently, the central portion 22A of the side panel 22 is then oriented toward the rear of the vehicle.

This central portion 22A of the side panel 22 of the sitting part 20 at least partially blocks a second opening located at the rear of the seat 100, behind this central portion 22A.

This second opening opens into a recess in the internal structure 300 of the vehicle.

In this receiving position, the sitting part 20 enables the user to sit on the seat cushion 23 provided on the upper face 21A of the sitting panel 21. The user's back rests against the central portion of the side panel 22 and the back part 10. His legs pass over the front edging 24A of the sitting part 20.

In the turned-over position of the sitting part (FIGS. 1 and 3), the sitting panel 21 extends between the back part 10 and the side panel 22 of the sitting part 20.

The lower face 21B of the sitting panel 21 is oriented toward the user, and the upper face 21A of the sitting panel 21 is then oriented toward the floor 200 of the vehicle. Finally, the central portion 22A of the side panel 22 of the sitting part 20 is oriented toward the front of the vehicle.

In this turned-over position, the sitting panel 21 is elevated above the floor of the vehicle by the side panel 22. Consequently, the sitting part 20 delimits within itself, in this case, a housing in which the user can store his personal belongings. The sitting part 20 closes the upper part of this housing.

This housing is even larger because it preferably overhangs the aforementioned opening in the floor.

The sitting part 20 then forms a storage box.

For fixing the sitting part 20 of the seat 100 in the vehicle, the sitting part 20 comprises means 40 for mounting it on the floor 200 of the vehicle in its two positions, namely the receiving position and the turned-over position.

These mounting means 40 are adapted to interact with complementary mounting means 210 on the floor of the vehicle.

In this case, the mounting means are pivotable mounting means, using a hooking method for example, or socket or slide-in mounting means.

The sitting part 20 also comprises attachment means 50 adapted to interact with complementary attachment means 60 of the back part 10 in the two positions, namely the receiving and the turned-over position, so as to attach the sitting part 20 to the back part 10.

Finally, the detachable main part 11 of the back part 10 also comprises means 30 for locking this detachable main part 11 onto the sitting part 20, while simultaneously preventing the movement of this detachable main part 11 of the back part and the movement of the sitting part 20.

Advantageously, the locking means 30 are, in this case, adapted to lock the sitting part 20 in its two positions, namely its receiving and turned-over positions.

These locking means 30 are, for example, key-operated locking means. In the present case they comprise a single lock 31 belonging to the back part 10 and means of interaction with this lock in the two positions, namely the receiving and turned-over positions, belonging to the sitting part 20. These means of interaction comprise, for example, for each of the two positions of the sitting part 20, a housing adapted to receive a bolt of the lock 31, thereby blocking any movement of the sitting part.

In the present case, the lock 31 comprises a barrel, one face of which is accessible on the front face of the detachable main part 11 of the back part 10.

This barrel is held at the level of the tab 13 of the detachable main part 11 of the back part 10. Advantageously, in this case, the lug 14 for attaching the detachable main part 11 to the fixed part 12 of the back part 10 is carried by the barrel of the lock 31. This attachment lug 14 and the bolt of the lock pivot simultaneously.

The sitting part 20 also comprises, in the present case, an opening 26 (FIGS. 1 to 3) adapted for the passage of a safety belt buckle 80 (FIG. 1) when the sitting part 20 is in its receiving position.

As shown in FIGS. 1 to 3, the opening 26 for the passage of the safety belt buckle 80 is provided in a general way, in this case, in a rear corner of the sitting part 20.

More precisely, it is positioned so as to extend into one of the end portions 22B of the side panel 22 and into the sitting panel 21 of the sitting part 20.

This opening has an oblong shape. It houses part of the seat cushion 23 of the sitting part 20.

The safety belt buckle 80 comprises a casing within which means of fastening the safety belt are housed.

These fastening means are, in the present case, clip fastening means, comprising, for example, a clip fastening tooth. These fastening means are adapted to interact with complementary means on the safety belt in order to fasten the belt. These means are, for example, a plate having an aperture on the edge of which the clip fastening tooth engages.

This plate is inserted into a slot in the casing and is thus guided until it is clipped into the clip fastening means of the buckle 80.

A push button accessible at one of the ends of the casing can be actuated to disengage the clip fastening tooth from the aperture and to allow the withdrawal of the safety belt.

At its other end, the casing has means for mounting on the structure of the passenger compartment of the vehicle, by screwing for example.

The casing of the safety belt buckle 80 is thus mounted in a fixed and rigid manner close to the seat 100.

The seat 100 then comprises a filler piece 90 adapted to close this opening 26 in the turned-over position of the sitting part 20.

Figure 8:
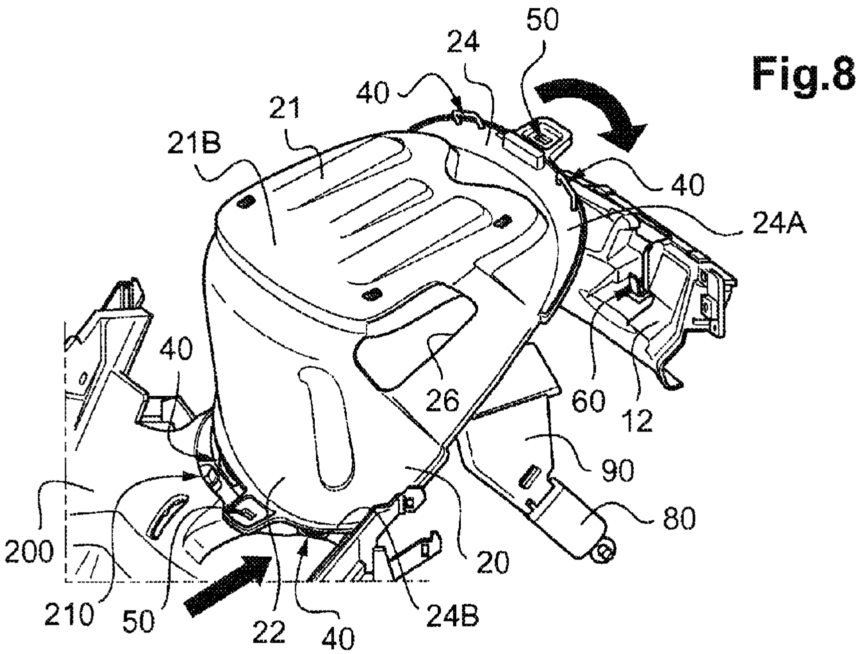
Figure 9:
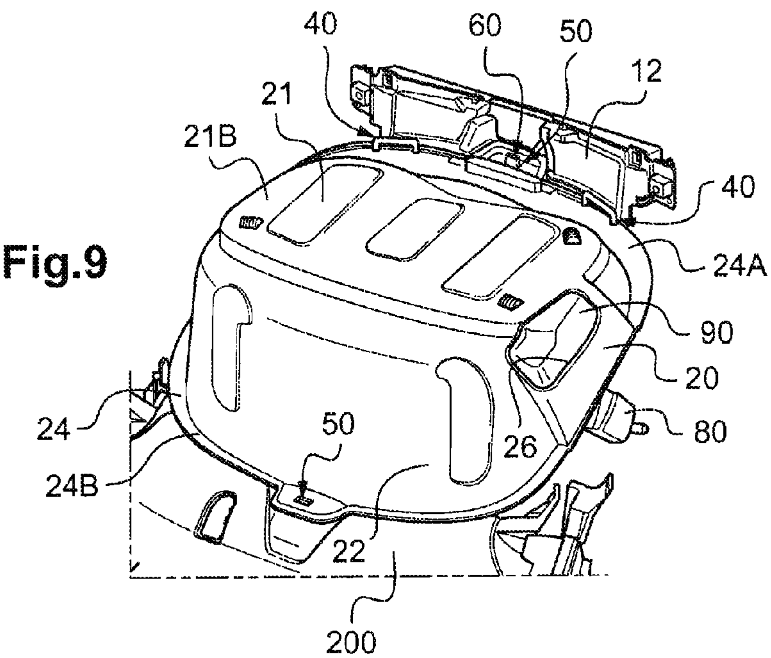

The filler piece 90 is shown more particularly in FIGS. 4, 8 and 9.

It takes the form of a shell of elongate shape, having a first free end 91 whose shape is adapted to block said opening 26 of the sitting part 20 and a second free end comprising fastening means adapted to fasten this filler piece 90 to said safety belt buckle 80 (FIG. 4).

More precisely, as shown in FIG. 2, the first free end 91 of the filler piece has a shape such that the outer surface 91A of this free end 91 extends in continuation of the outer surface of the sitting panel 21 and of the side panel 22 of the sitting part 20. The outer surface of the sitting panel 21 and of the side panel 22 of the sitting panel 20 is defined, in this case, as the surface oriented toward the outside of the sitting part 20. This surface then consists of the rear face 21B of the sitting panel 21 and the outer face of the side panel 22 which continues this rear face 21B of the sitting panel 21.

The means 93 for fastening the filler piece are clip fastening means adapted to be clipped into said safety belt buckle 80 (FIG. 4).

Advantageously, said storage means 18 of the detachable main part 11 of the back part 10 are adapted to house this filler piece 90 when the sitting part 20 is in its receiving position and the filler piece 90 is not used (FIG. 4).

Method

The use of the seat according to the invention will now be described in greater detail.

The sitting part is initially considered to be in its receiving position, shown in FIG. 1.

In this receiving position, the filler piece 90 is stored, being housed in the storage means 18 of the detachable main part 11 of the back part 10. In this case, it is slid between the elastic tapes 18 and the rear face of the detachable part 11 of the back part 10.

When the user wishes to turn over the sitting part 20 of the seat 100, for example in order to place his belongings in the storage box formed by the turned-over sitting part, he performs the following steps.

First of all, the user inserts the appropriate key into the barrel of the lock 31, which is accessible on the front face of the back part 10.

Figure 5:
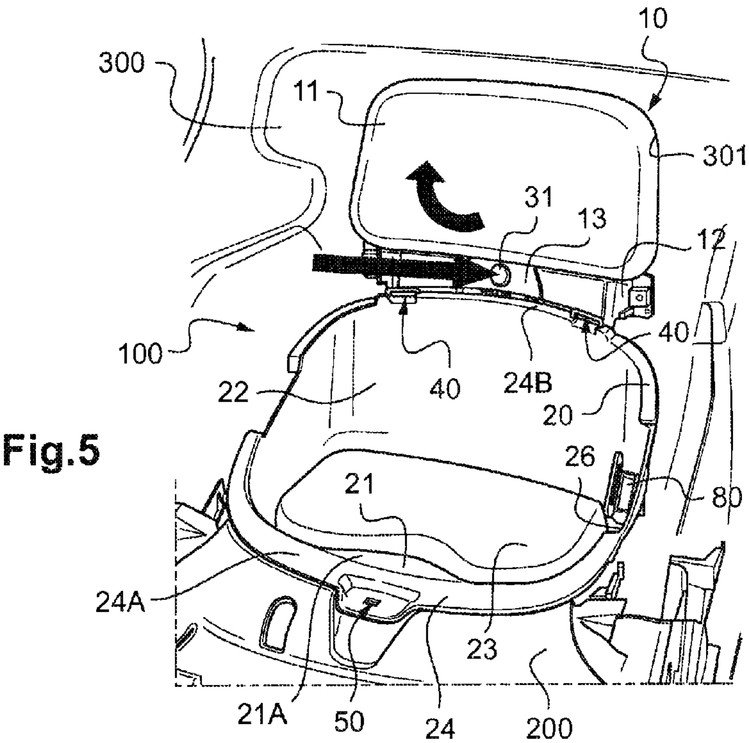
FIGS. 5 to 9 are schematic views of the seat of FIG. 1 in a number of steps of the use of the back part.
Figure 7:
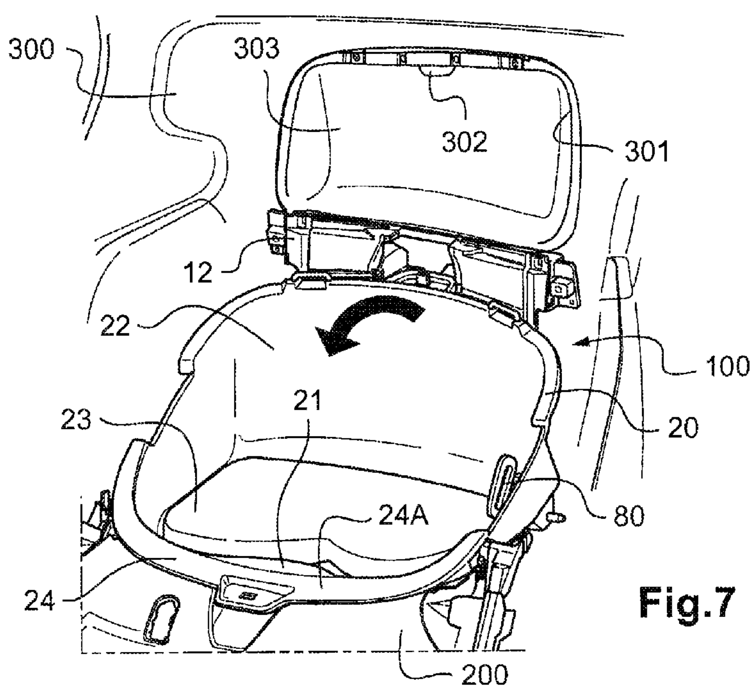

He thereby frees the detachable main part 11 from its interaction with the fixed part 12 of the back part 10 and simultaneously unlocks the sitting part 20 by turning the key in the lock 31 (FIG. 5).

Figure 6:
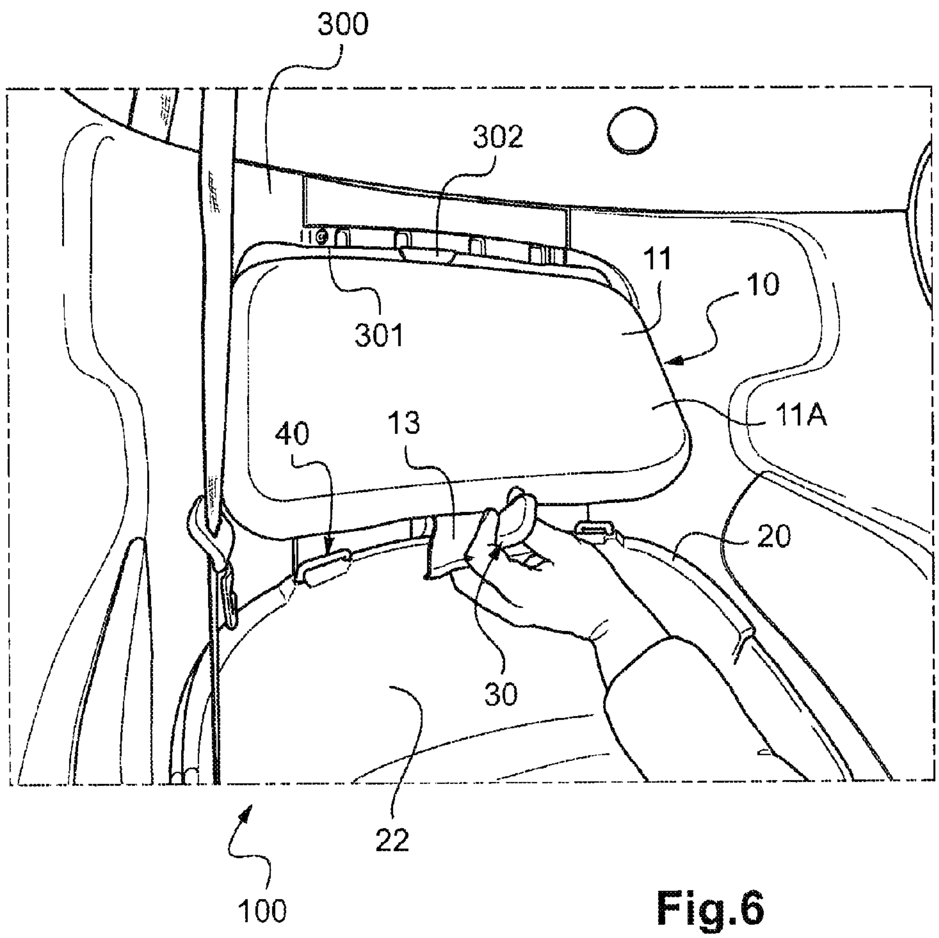

Finally, in order to allow the sitting part 20 to pivot, the user separates the detachable part 11 of the back part 10 from its fixed part 12 (FIG. 6).

The sitting part 20 can then pivot on the floor 200 because of its mounting means 40 (FIG. 8).

However, the sitting part 20 continues to be held on the floor and on the back part 10 by the interaction of the mounting means 40 and attachment means 50 of the sitting part 20 with the complementary means 60 described above.

The user causes the sitting part 20 to pivot relative to the floor 200 of the vehicle about a pivot axis located near the front edging 24A of this sitting part 20 (FIG. 8). When this is done, the attachment means of the sitting part 20 are freed from their interaction with the complementary attachment means 60 of the back part 20.

The user raises the sitting part 20 so as to free the mounting means 40 of the sitting part 20 from their interaction with the complementary mounting means 210 of the floor of the vehicle.

The user removes the filler piece 90 from the elastic tapes 18 which retain it behind the detachable part 11 of the back part 10. He clips it into the safety belt buckle 80.

He turns over the sitting part 20 so as to position its sitting panel 21 between the back part 10 and its side panel 22.

He re-establishes the interaction of the mounting means of the sitting part 20 with the complementary mounting means of the floor 200 of the vehicle.

He then causes said sitting part 20 to pivot until the means 50 for attaching the sitting part 20 to the back part 10 of the seat 100 interact with the complementary attachment means 60 of the back part 10 (FIG. 10). When this is done, the opening 26 in the sitting part 20 comes to bear against the first end 91 of the filler piece 90 (FIG. 11).

The user then refits the detachable main part 11 of the back part 10 on its fixed part 12.

For this purpose, he engages the tooth 302, which projects into the opening 301 in the internal structure 300 of the vehicle, in the hook 16 of the detachable main part 11 of the back part 10, then causes this detachable part 11 to pivot about an axis substantially parallel to the longitudinal sides of the detachable main part 11 of the back part 10 in order to fit this detachable main part 11 into the opening 301 in the internal structure 300 of the vehicle.

Finally, he locks said locking means 30. When this is done, the attachment lug 14 of the detachable main part is attached behind the transverse bar 12A of the fixed part 12 of the back part 10, and the lock bolt is housed in the complementary housing of the sitting part.

The sitting part 20 is then in the locked, turned-over position of FIG. 2.

The storage space located under the sitting part is therefore secured while being preserved.

The key-operated locking means described here are locking means comprising a mechanical key adapted to cause the movement of the lock bolt.

However, it would be feasible for the key to be a digital key transmitted to electrical means of moving the lock bolt.

The invention claimed is:

1. A seat for a motor vehicle, comprising:

a back part; and a sitting part, wherein said back part comprises at least one detachable main part, which is adapted to be entirely separated from the rest of the seat, wherein the detachable main part comprises storage means fixed to a rear of the detachable main part, and wherein said detachable main part of the back part comprises means for locking the detachable main part onto the sitting part, while simultaneously preventing movement of the detachable main part of the back part and movement of the sitting part.

2. The seat as claimed in claim 1, wherein said storage means comprise at least two elastic tapes.

3. The seat as claimed in claim 2, wherein said elastic tapes are positioned vertically at the rear of the detachable main part of the back part.

4. The seat as claimed in claim 1, wherein said storage means comprise at least a net.

5. The seat as claimed in claim 1, wherein said sitting part is configured to be turned over, between a receiving position in which the sitting part is adapted to receive a passenger and a turned-over position in which the sitting part forms a housing in an interior, and comprises an opening adapted to allow the passage of a safety belt buckle in the receiving position, a filler piece being provided for closing said opening in the turned-over position of the sitting part and said storage means being adapted to house said filler piece when the sitting part is in the receiving position.

6. The seat as claimed in claim 5, wherein the means for locking includes a lock and the sitting part is configured to interact with the lock in the receiving position and the turned-over position.

7. The seat as claimed in claim 5, wherein the filler piece has a first end shaped to block the opening of the sitting part.

8. The seat as claimed in claim 7, wherein the filler piece has a second end including a fastener to fasten the filler piece to the safety belt buckle.

9. The seat as claimed in claim 1, wherein said detachable main part of the back part comprises means of retention on an internal structure of the passenger compartment of the vehicle.

10. The seat as claimed in claim 1, wherein said back part further comprises a fixed part adapted to be mounted in a non-detachable way on an internal structure of the passenger compartment of the vehicle, said detachable main part of the back part comprising means of interaction with complementary interaction means of the fixed part of the back part for holding detachable main part in a mounted position on the fixed part of the back part.

11. A motor vehicle, comprising:

an internal structure delimiting a passenger compartment of the vehicle; and a seat mounted on said structure of the passenger compartment, the seat including a back part and a sitting part, wherein said back part comprises at least one detachable main part, which is adapted to be entirely separated from the rest of the seat, wherein the detachable main part comprises storage means fixed to a rear of the detachable main part, wherein said detachable main part is attached directly to the internal structure of the passenger compartment of the vehicle, and wherein said back part mounted in a non-detachable way directly to the internal structure of the passenger compartment of the vehicle.

12. The motor vehicle as claimed in claim 11, wherein said internal structure comprises a recess located at the rear of the back part, the access to the recess being freed when said detachable main part of said back part is separated from the rest of the seat.

13. The motor vehicle as claimed in claim 11, wherein said sitting part is configured to be turned over, between a receiving position in which the sitting part is adapted to receive a passenger and a turned-over position in which the sitting part forms a housing in an interior, and comprises an opening adapted to allow the passage of a safety belt buckle in the receiving position, a filler piece being provided for closing said opening in the turned-over position of the sitting part and said storage means being adapted to house said filler piece when the sitting part is in the receiving position.

14. The motor vehicle as claimed in claim 11, wherein said detachable main part of the back part comprises means for locking the detachable main part onto the sitting part, while simultaneously preventing movement of the detachable main part of the back part and movement of the sitting part.

15. A seat for a motor vehicle, comprising:

a back part; and a sitting part, wherein said back part comprises at least one detachable main part, which is adapted to be entirely separated from the rest of the seat, wherein the detachable main part comprises storage means fixed to a rear of the detachable main part, and wherein said sitting part is configured to be turned over, between a receiving position in which the sitting part is adapted to receive a passenger and a turned-over position in which the sitting part forms a housing in an interior, and comprises an opening adapted to allow the passage of a safety belt buckle in the receiving position, a filler piece being provided for closing said opening in the turned-over position of the sitting part and said storage means being adapted to house said filler piece when the sitting part is in the receiving position.

* * * * *